United States Patent [19]

Miyoshi et al.

[11] 3,903,261

[45] Sept. 2, 1975

[54] DENTIFRICE

[75] Inventors: Makoto Miyoshi, Funabashi; Tsutomu Maeyama, Chiba; Daini Saika, Funabashi; Takuma Yanagawa, Tokyo; Kiyohiro Kohashi, Tokyo; Masuzo Nagayama, Tokyo, all of Japan

[73] Assignees: The Lion Dentrifice Co., Ltd.; Lion Fat & Oil Co., Ltd., both of Tokyo, Japan

[22] Filed: Oct. 2, 1973

[21] Appl. No.: 402,796

[30] Foreign Application Priority Data
Dec. 28, 1972 Japan.................................. 47-1966

[52] U.S. Cl. ................................................. 424/56
[51] Int. Cl................................................ A61k 7/16
[58] Field of Search ............................. 424/49–58; 260/215

[56] References Cited
UNITED STATES PATENTS
3,720,659  3/1973  Guiseley et al. .................... 260/215

FOREIGN PATENTS OR APPLICATIONS
813,900  5/1959  United Kingdom................. 260/215

OTHER PUBLICATIONS

Watson, *J. Soc. Cosmet. Chem.*, Vol. 21, page 465, 1970.

*Primary Examiner*—Richard L. Huff
*Attorney, Agent, or Firm*—Oblon, Fisher, Spivak, McClelland & Maier

[57] ABSTRACT

An alkali metal salt of sulfated cellulose which has a degree of substitution of 0.3 – 2.5 and a viscosity as a 0.5% aqueous solution at 25°C as measured by a BL viscometer at 30 rpm greater than 100 cps is prepared by reacting wood pulp with a pyridine-sulfuric anhydride complex and neutralizing the resulting product with an alkaline compound.

8 Claims, 1 Drawing Figure

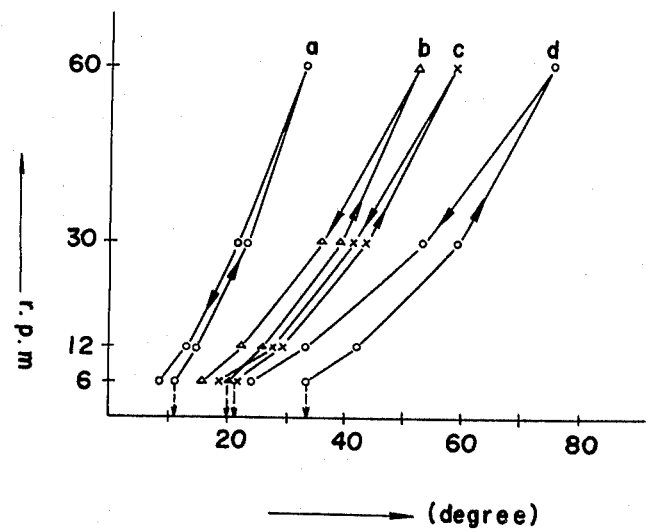

DENTIFRICE

BACKGROUND OF THE INVENTION

1. Field of the Invention

This invention relates to a dentifrice. More particularly, it relates to a dentifrice which is stable and gives a fresh, clean sensation to the mouth.

2. Description of the Prior Art

In the past, conventional dentrifrices have been prepared by combining a polishing agent, a humectant, a binder, a detergent, a sweetening agent, a flavoring agent, an antiseptic agent, a medical ingredient or other suitable ingredients and water.

Sodium carboxymethyl cellulose and carrageenan, which is the main component of a sulfated galactose, have been widely used as binders. However, carrageenan leaves a more pleasant sensation in the mouth than sodium carboxylmethyl cellulose while it also provides a stable composition. The sodium carboxylmethyl cellulose is a synthetic material and can be obtained in a uniform predetermined quality. However, dentifrices containing sodium carboxylmethyl cellulose leave an unsuitable sensation in the mouth, have an especially low foam stability and have generally unstable shelf lives. Generally, there is a correlation between the foam stability of the dentifrice and the sensation left in the mouth so that dentifrices with greater foam stability give greater oral sensations. On the other hand, dentifrices which contain carrageenan have good stability and leave a very good sensation in the mouth. However, carrageenan is a natural product, and the supply of carrageenan is not constant because of fluctuations in production and because the quality of the raw material varies depending upon the district from which it is obtained and the season in which it is obtained. Because of these variations in quality, it has been difficult to prepare dentifrices having constant viscosity and shape stability. Moreover, the germination of microorganisms in the carrageenan is also a problem. As alternative binders, it has been proposed to use sulfated gua gum or tragacanth gum, which is the main component of a sulfated galactose or mannose. However, these binders have not found significant acceptance. Certain sulfated cellulose binders have also been available. However, these sulfated cellulose binders provide dentifrices with low viscosity and low shape stability, and therefore, have no practical utility.

A need, therefore, continues to exist for dentifrice compositions which contain a binder having excellent stability with a constant viscosity.

SUMMARY OF THE INVENTION

Accordingly, one object of the invention is to provide a dentifrice which contains a binder prepared from cellulose whose supply is stable.

Another object of the invention is to provide a dentifrice which contains a binder which leaves an excellent sensation in the mouth while having excellent stability.

Yet another object of the invention is to provide a dentifrice which has a constant viscosity and shape stability.

Briefly, these objects and other objects of the invention as hereinafter will become more readily apparent can be attained by a dentifrice which comprises a binder of at least one alkali metal salt of a sulfated cellulose which has a degree of substitution of 0.3 – 2.5 and a viscosity as a 0.5% aqueous solution (BL viscometer 30 rpm, 25°C) greater than 100 cp.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

The FIGURE shows the flow-curves for a series of binders.

DESCRIPTION OF THE PREFERRED EMBODIMENTS

In the analysis of the alkali metal salts of the sulfated cellulose (hereinafter referred to as D.S.) materials of the invention to determine the degree of substitution thereof, samples of the cellulose materials are burned to generate $SO_2$ which is converted to $SO_3$ by hydrogen peroxide. The $SO_3$ produced is absorbed in water to form $H_2SO_4$ or a salt thereof, and then $BaCl_2$ is added to the sulfuric acid formed whereby $BaSO_4$ is precipitated. Excess $Ba^{+2}$ in solution is titrated with a solution of a chelate forming material. The analytical procedure determines the degree of substitution of the glucose residual group of the sulfated cellulose. Accordingly, the maximum degree of substitution is 3.0.

The alkali metal salt of the sulfated cellulose used in the dentifrice of the invention can be prepared by heating wood pulp which has a specific viscosity greater than 5.0 as measured by the Japanese Industrial Standard P90015.5 A procedure in acetone, and then replacing the acetone with pyridine. The wood pulp is reacted with a pyridine-sulfuric anhydride complex in the presence of pyridinium hydrochloride in pyridine at 40° – 80°C for more than 1 hour, and then the product is neutralized with an alkali such as sodium hydroxide, sodium bicarbonate, sodium carbonate, sodium acetate, potassium hydroxide, potassium carbonate, potassium bicarbonate or potassium acetate. The alkali metal salt of the sulfated cellulose produced usually has a degree of substitution of 0.3 – 2.5, preferably 0.5 – 2.0, especially 0.7 – 1.8.

The viscosity of a 0.5% aqueous solution of an alkali metal salt of the sulfated cellulose as measured by a BL viscometer at 25°C at 30 rpm. should be greater than 100 cp. and preferably less than 10,000 cp. Even if the viscosity is less than 100 cp., it is still possible to use the cellulose salt. However, binders of this viscosity result in more expensive dentifrices. Further, other disadvantages acrue with the dentifrice because larger quantities of binder must be used. For these reasons cellulose salt binders with a viscosity less than 100 cp. are not desirable.

If the degree of substitution of the binder is less than 0.3, the stability of the binder and the fresh, oral sensations left in the mouth are not much better than those dentifrices which use the conventional binders. Moreover, the alkali metal salts of the sulfated cellulose which have a degree of substitution greater than 2.5 have essentially the same effects as those cellulose salts with a degree of substitution less than 2.5.

The alkali metal salt of the sulfated cellulose binder is combined with the dentifrice in the range of 0.1 – 5.0 wt.%, preferably 0.5 – 2.5 wt.%, especially 0.7 – 1.2 wt.%. The alkali metal salt of the sulfated cellulose of such metals as sodium or potassium can be used individually or as mixtures of the various alkali salts thereof. Other conventional binders such as alkali metal carboxymethyl cellulose can be combined with the alkali metal salt of the sulfated cellulose, although no real advantage is gained by combining a conventional binder with the cellulose salt binder of the invention. The dentifrice of the invention is characterized by the alkali metal salt of the sulfated cellulose which has a specific degree of sulfonation and a specific viscosity.

The present invention provides a dentifrice which has excellent stability and which leaves an excellent sensation in the mouth because of the improved foam stability. Moreover, if the viscosity of the dentifrice is decreased by combining the alkali metal salt of the sulfated cellulose with an alkyl or alkylbenzene sulfate or sulfonate or the like detergent and is less than those dentifrices which contain carrageenan, then the combined cellulose salt binder and detergent can be used in liquid dentifrices. The term dentifrice as used throughout the specification includes dental preparations such as toothpastes, dental creams, liquid dentifrices, mouth washes and the like. The overall general formula of dentifrices is well-known in the art. However, in a preferred embodiment of the dentifrices of the invention, the dentifrices contains 20 – 70 wt.% of a polishing agent, 10 – 50 wt.% of a humectant, 0.5 – 5 wt.% of a detergent, and 0.5 – 2.5 wt.% of a binder of an alkali metal salt of sulfated cellulose. Accordingly, the recitation of the other specific ingredients of the general formula of the dentifrice is omitted, and only the binder which is used in the dentifrice is discussed.

The following are test results of the foam stability of the alkali metal salt of the sulfated cellulose and the stability of the composition.

TEST 1

A 3 g amount of glycerin, 0.5 g of a binder and 96.5 g of water were mixed to form a 0.5% aqueous solution of the binder. A sodium lauryl sulfate detergent was added to the aqueous solution of the binder, and the resistance to change in viscosity caused by the addition of the detergent, which indicates the stability of the dentifrice which contains the binder, was observed by measuring the viscosity of the solution with a BL viscometer (30 rpm. 25°C). The decreased rate of viscosity of the solution containing the sodium salt of the sulfated cellulose (in the range of our invention) caused by the addition of the detergent was substantially less than the viscosity rates of other binders as shown in Table I.

TEST 2

A 30 g amount of the dentifrice which has the formulation shown below was combined with various binders to form several compositions which were diluted with 30 g of water, and each mixture was passed through a foam tester to form a foam. The foam from each mixture was passed into a 200 ml beaker, and the flow curve for each foam was observed by measuring the change of viscosity with a BL viscometer. The results are shown in FIGURE 1 wherein curve $a$ is sodium carboxymethyl cellulose, curve $b$ is commercial Na sulfonated cellulose, curve $c$ is carrageenan, and curve $d$ is the Na sulfonated cellulose (D.S. 1.45), 0.5% sol. viscosity 235 cp) of the invention. The physical properties of the dentifrices plotted in FIG. 1 are shown in Table II.

| Formulation | (wt %) |
|---|---|
| Insoluble dicalcium phosphate | 50 |
| Sorbitol | 20 |
| Sodium lauryl sulfate | 2 |
| Binder | 1 |
| Sodium saccharinate | 0.1 |
| Flavor | 0.9 |
| Water | 26 |

| Conditions of Foam Tester | |
|---|---|
| Rotation | 350 rpm. (max) |
| Rate of N₂ feed | 100 ml/min. |
| Brush | tooth brush made of nylon filaments |

Total volume including the brush is 160 ml.

TABLE II

| Binder | Viscosity (at 60 rpm) | Yield value |
|---|---|---|
| Na carboxymethyl cellulose | 670 cp | 11.0 |
| Na sulfated cellulose (commercial product) | 1,050 cp | 20.0 |
| Carrageenan | 1,180 cp | 21.0 |
| Na sulfated cellulose (the invention) | 1,520 cp | 33.5 |

The foam stability of the dentifrices containing the Na carboxymethyl cellulose, the Na sulfonated cellulose (commercial product), the carrageenan and the Na sulfonated cellulose (the invention) was tested by a test panel of ten experts. The results of the tests of the foam stability of each dentifrice are shown by the following sequence.

Na sulfated cellulose (the invention) > Carrageenan > Na sulfated cellulose (commercial product) > Na carboxymethyl cellulose.

TABLE I

| Binder | 0.5% solution viscosity | Na laurayl sulfate (%) | | | |
|---|---|---|---|---|---|
| | | 0% | 0.4% | 0.8% | 1.2% |
| Na sulfated cellulose (D.S. 1.45) | 235 cp | 100 | 66.0 | 34.0 | 29.8 |
| Na sulfated cellulose (D.S. 0.82) | 305 cp | 100 | 49.2 | 37.7 | 32.8 |
| Na sulfated cellulose (commercial product) | 98 cp | 100 | 30.8 | 15.4 | 11.5 |
| Carrageenan | 152 cp | 100 | 7.3 | 6.1 | 5.2 |

The physical data which is related to the foam stability correlated very well to the results of the foam stability test.

TEST 3

A 5 g amount of glycerine, 1 g of a binder and 94 g of water were mixed to form a 1% aqueous solution of the binder, and the growth of microorganisms in the solution was tested at room temperature by observing the formation of colonies of the microorganisms on the surface of the solution. When carrageenan was used as the binder, the formation of the colonies was observed after several days. However, when the sodium salt of sulfated cellulose was used, no colonies were observed.

Having generally described this invention, a further understanding can be obtained by reference to certain specific examples which are provided herein for purpose of illustration only and are not intended to be limiting unless otherwise specified. In the examples, % designates % by weight.

EXAMPLE 1

Dental Cream

| | |
|---|---|
| Insoluble dicalcium phosphate | 50% |
| Sorbitol | 20% |
| Na lauryl sulfate | 2.0% |
| Na sulfated cellulose | 1.2% |
| (D.S. 1.18, 0.5% sol. viscosity 185 cp) | |
| Butyl para-hydroxybenzoate | 0.002% |
| Ethyl para-hydroxybenzoate | 0.005% |
| Na saccharinate | 0.1% |
| Flavor | 1.0% |
| Water | balanced to 100% |

EXAMPLE 2

Dental Cream

| | |
|---|---|
| Insoluble dicalcium phosphate | 50% |
| Sorbitol | 20% |
| Na lauryl sulfate | 2.0% |
| Na sulfated cellulose | 0.6% |
| (D.S. 0.51, 0.5% sol. viscosity 4000 cp) | |
| Na saccharinate | 0.1% |
| Flavor | 1.0% |
| Water | balanced to 100% |

EXAMPLE 3

Dental Cream

| | |
|---|---|
| Insoluble dicalcium phosphate | 45% |
| Glycerine | 25% |
| Na lauryl sulfate | 2.0% |
| Na sulfated cellulose | 1.0% |
| (D.S. 1.68, 0.5% sol. viscosity 540 cp) | |
| Na saccharinate | 0.1% |
| Flavor | 1.0% |
| Water | balanced to 100% |

EXAMPLE 4

Dental Cream

| | |
|---|---|
| Calcium carbonate (crushed) | 30% |
| Calcium carbonate (precipitated) | 20% |
| Sorbitol | 20% |
| Na lauryl sulfate | 2.0% |
| K sulfated cellulose | 1.5% |
| (D.S. 2.21, 0.5% sol. viscosity 78 cp) | |
| Stannous fluoride | 0.4% |
| Na saccharinate | 0.1% |
| Flavor | 1.0% |
| Dental Cream | |
| Water | balanced to 100% |

EXAMPLE 5

Dental Cream

| | |
|---|---|
| Insoluble dicalcium phosphate | 50% |
| Sorbitol | 20% |
| Na lauryl sulfate | 2.0% |
| Na sulfated cellulose | 0.8% |
| (D.S. 1.52, 0.5% sol. viscosity 1000 cp) | |
| Na monofluorophosphate | 0.76% |
| Na saccharinate | 0.1% |
| Flavor | 1.0% |
| Water | balanced to 100% |

EXAMPLE 6

Dental Cream

| | |
|---|---|
| Calcium carbonate (crushed) | 30% |
| Calcium carbonate (precipitated) | 20% |
| Glycerine | 20% |
| Na lauryl sulfate | 2.0% |
| Na sulfated cellulose | 0.6% |
| (D.S. 2.03, 0.5% sol. viscosity 1500 cp) | |
| Na monofluorophosphate | 0.8% |
| Na saccharine | 0.09% |
| Flavor | 0.9% |
| Water | balanced to 100% |

EXAMPLE 7

Dental Cream

| | |
|---|---|
| Insoluble sodium metaphosphate | 30% |
| Aluminum hydroxide | 20% |
| Na lauryl sulfate | 2.0% |
| Na sulfated cellulose | 1.0% |
| (D.S. 0.48, 0.5% sol. viscosity 325 cp) | |
| Stannous fluoride | 0.4% |
| Glycerine | 20% |
| Na saccharinate | 0.1% |
| Flavor | 1.0% |
| Water | balanced to 100% |

EXAMPLE 8

Dental Cream

| | |
|---|---|
| Insoluble dicalcium phosphate | 50% |
| Glycerine | 20% |
| Na lauryl sulfate | 2.0% |
| Na carboxymethyl cellulose | 0.5% |
| Na sulfated cellulose | 0.9% |
| (D.S. 0.66, 0.5% sol. viscosity 67 cp) | |
| Na saccharinate | 0.1% |
| Flavor | 0.9% |
| Water | balanced to 100% |

EXAMPLE 9

Dental Cream

| | |
|---|---|
| Calcium carbonate (crushed) | 30% |
| Calcium carbonate (precipitated) | 20% |
| Sorbitol | 20% |
| Na lauryl sulfate | 2.0% |
| Na sulfated cellulose | 1.1% |
| (D.S. 1.74, 0.5% sol. viscosity 293 cp) | |
| Na saccharinate | 0.09% |
| Flavor | 1.0% |
| Dental Cream | |
| Water | balanced to 100% |

EXAMPLE 10

Dental Cream

| | |
|---|---|
| Insoluble dicalcium phosphate | 50% |
| Sorbitol | 20% |
| Na lauryl sulfate | 2.2% |
| Na sulfated cellulose<br>(D.S. 2.35, 0.5% sol.<br>viscosity 735 cp) | 1.0% |
| Na monofluorophosphate | 0.76% |
| Na saccharinate | 0.1% |
| Flavor | 1.0% |
| Water | balanced to 100% |

EXAMPLE 11

Dental Cream

| | |
|---|---|
| Calcium carbonate (crushed) | 30% |
| Calcium carbonate (precipitated) | 20% |
| Glycerine | 20% |
| Na lauryl sulfate | 2.0% |
| Na sulfated cellulose<br>(D.S. 0.74, 0.5% sol.<br>viscosity 1850 cp) | 0.7% |
| Na saccharinate | 0.095% |
| Flavor | 1.0% |
| Water | balanced to 100% |

EXAMPLE 12

Dental Cream

| | |
|---|---|
| Insoluble dicalcium phosphate | 50% |
| Sorbitol | 20% |
| Na lauryl sulfate | 2.0% |
| Na sulfated cellulose<br>(D.S. 0.96, 0.5% sol.<br>viscosity 450 cp) | 1.0% |
| Na saccharinate | 0.1% |
| Flavor | 1.0% |
| Water | balanced to 100% |

EXAMPLE 13

Liquid dentrifrice

| | |
|---|---|
| Glycerine | 35% |
| Na lauryl sulfate | 1.0% |
| Na sulfated cellulose<br>(D.S. 0.38, 0.5% sol.<br>viscosity 150 cp) | 1.2% |
| Na saccharinate | 0.1% |
| Alcohol | 3.0% |
| Na monofluorophosphate | 0.8% |
| Flavor | 0.9% |
| Water | balanced to 100% |

EXAMPLE 14

Liquid dentrifrice

| | |
|---|---|
| Sorbitol | 30% |
| Na lauryl sulfate | 1.0% |
| Na sulfated cellulose<br>(D.S. 1.78, 0.5% sol.<br>viscosity 365 cp) | 1.0% |
| Na saccharinate | 0.1% |
| Alcohol | 3.0% |
| Na monofluorophosphate | 0.8% |
| Flavor | 0.9% |
| Water | balanced to 100% |

EXAMPLE 15

Liquid dentifrice

| | |
|---|---|
| Glycerine | 35% |
| Na lauryl sulfate | 1.0% |
| Na sulfated cellulose<br>(D.S. 1.08, 0.5% sol.<br>viscosity 73 cp) | 1.5% |
| Na saccharinate | 0.09% |
| Alcohol | 3.5% |
| Na monofluorophosphate | 0.76% |
| Flavor | 0.9% |
| Water | balanced to 100% |

Having now fully described this invention, it will be apparent to one of ordinary skill in the art that many changes and modifications can be made thereto without departing from the spirit or scope of the invention as set forth herein.

We claim:

1. In a dentifrice composition containing a humectant and a detergent, the improvement comprising incorporating therein as a binder an alkali metal salt of a sulfated cellulose prepared by
   a. heating wood pulp of specific viscosity greater than 5.0 in acetone,
   b. replacing the acetone of (a) with pyridine;
   c. reacting the product of (b) with a complex of pyridine-sulfuric anhydride in the presence of pyridinium hydrochloride;
   d. neutralizing the product of (c) with an alkali to form the alkali metal salt of sulfated cellulose; said alkali metal salt having a degree of substitution of 0.3 – 2.5 and a viscosity of greater than 100 cps as measured by a BL viscometer at 30° RPM and 25°C in a 0.5% aqueous solution wherein 0.1 – 5.0% by weight of said binder is incorporated into said dentifrice composition.

2. The dentifrice of claim 1, wherein said alkali metal salt of sulfated cellulose has a degree of substitution of 0.5 – 2.0 and a viscosity as a 0.5% aqueous solution in the range of 100 – 10,000 cp.

3. The dentifrice of claim 1, which further comprises a water insoluble polishing agent, a flavoring material and a detergent.

4. The dentifrice of claim 1, which further comprises a flavoring material.

5. The dentifrice of claim 1, wherein 0.5 – 2.5% by weight of the alkali metal salt of sulfated cellulose is incorporated in the dentifrice.

6. The dentifrice of claim 1, wherein said alkali metal salt of sulfated cellulose and an alkali metal carboxymethyl cellulose are incorporated in the dentifrice.

7. The dentifrice of claim 1, wherein an alkyl or alkylbenzene sulfate or sulfonate detergent is combined with the alkali metal salt of sulfated cellulose.

8. The dentifrice of claim 1, which comprises
   a polishing agent of 20 – 70% by weight,
   a humectant of 10 – 50% by weight,
   a detergent of 0.5 – 5% by weight, and
   a binder of the alkali metal salt of sulfated cellulose of 0.5 – 2.5% by weight.

* * * * *